(12) United States Patent
Khazov et al.

(10) Patent No.: US 11,880,939 B2
(45) Date of Patent: Jan. 23, 2024

(54) EMBEDDING COMPLEX 3D OBJECTS INTO AN AUGMENTED REALITY SCENE USING IMAGE SEGMENTATION

(71) Applicant: Intel Corporation, Santa Clara, CA (US)

(72) Inventors: Danny Khazov, Rehovot (IL); Itay Kaufman, Tel Aviv (IL); Or Weiser, Tel Aviv (IL); Zohar Avnat, Tel Aviv (IL); Roee Lazar, Givatayim (IL)

(73) Assignee: Intel Corporation, Santa Clara, CA (US)

( * ) Notice: Subject to any disclaimer, the term of this patent is extended or adjusted under 35 U.S.C. 154(b) by 566 days.

(21) Appl. No.: 16/998,333

(22) Filed: Aug. 20, 2020

(65) Prior Publication Data

US 2020/0380779 A1      Dec. 3, 2020

(51) Int. Cl.
| | |
|---|---|
| G06T 7/33 | (2017.01) |
| G06T 7/90 | (2017.01) |
| G06T 3/60 | (2006.01) |
| G06T 3/20 | (2006.01) |
| G06T 7/37 | (2017.01) |
| G06T 7/136 | (2017.01) |
| G06T 7/194 | (2017.01) |
| G06T 3/00 | (2006.01) |
| H04N 23/90 | (2023.01) |
| G06T 17/20 | (2006.01) |
| G06T 7/11 | (2017.01) |

(52) U.S. Cl.
CPC .............. *G06T 17/20* (2013.01); *G06T 7/11* (2017.01)

(58) Field of Classification Search
CPC ......... G06T 7/337; G06T 7/136; G06T 7/194; G06T 7/37; G06T 7/90; G06T 7/35; G06T 7/30; G06T 3/0075; G06T 3/20; G06T 3/602; G06T 2207/20041; G06T 2207/10024; G06T 2207/20076; G06T 2207/30228; G06T 2207/20104; H04N 23/90
See application file for complete search history.

(56) References Cited

U.S. PATENT DOCUMENTS

| | | | |
|---|---|---|---|
| 2005/0190966 A1* | 9/2005 | Etienne-Cummings | ..................... H04N 23/84 382/209 |
| 2013/0129205 A1* | 5/2013 | Wang | ...................... G06T 7/194 382/164 |
| 2013/0266218 A1* | 10/2013 | Jin | ....................... H04N 17/002 382/165 |
| 2017/0249766 A1* | 8/2017 | Namiki | .................... G06F 18/28 |
| 2018/0033155 A1* | 2/2018 | Jia | ......................... G06T 3/0093 |
| 2019/0139228 A1* | 5/2019 | Park | ......................... G06T 7/143 |

* cited by examiner

*Primary Examiner* — Martin Mushambo
(74) *Attorney, Agent, or Firm* — Essential Patents Group, LLP

(57) ABSTRACT

Techniques related to embedding a 3D object model within a 3D scene are discussed. Such techniques include determining two or more object mask images for two or more corresponding cameras trained on the 3D scene, projecting 3D points from the 3D object model to the image planes of the two or more cameras, and determining a position and orientation of the 3D object model in the scene using the object mask images and the projected 3D points.

20 Claims, 9 Drawing Sheets

EMBEDDING COMPLEX 3D OBJECTS INTO AN AUGMENTED REALITY SCENE USING IMAGE SEGMENTATION

BACKGROUND

In immersive video and other contexts such as computer vision applications, a number of cameras are installed around a scene of interest. For example, cameras may be installed in a stadium around a playing field. Using video attained from the cameras, a point cloud volumetric model representative of the scene is generated. A photo realistic view from a virtual view within the scene may then be generated using a view of the volumetric model which is painted with captured texture. Such views may be generated in every moment to provide an immersive experience for a user. Furthermore, the virtual view can be navigated in the 3D space to provide a multiple degree of freedom immersive user experience.

Generating detailed 3D structures takes great effort resource wise, even when some of the objects are static or restricted to a rigid motion. Furthermore, it is difficult to reconstruct accurate fine-detailed objects. Such difficulties may be overcome in part by pre-building some of the structures manually and locating them manually in the scene. However, such techniques have problems of alignment between the structures and the scene. Other techniques for automated object location in a 3D scene include visual hull techniques and training a network to locate the object. However, for even moderately complex objects, the results of visual hull techniques are inaccurate with the camera coverage available in immersive video contexts. Network training techniques also do not provide adequate accuracy. Yet other techniques include predefining features of the 3D objects and finding correspondences in the images. However, such techniques are not feasible for non-textured objects, when texture varies, or in contexts with limited camera coverage.

It is desirable to provide detailed 3D scenes in real-time in immersive video or augmented reality scene generation. It is with respect to these and other considerations that the present improvements have been needed. Such improvements may become critical as the desire to provide new and immersive user experiences in imaging and video becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
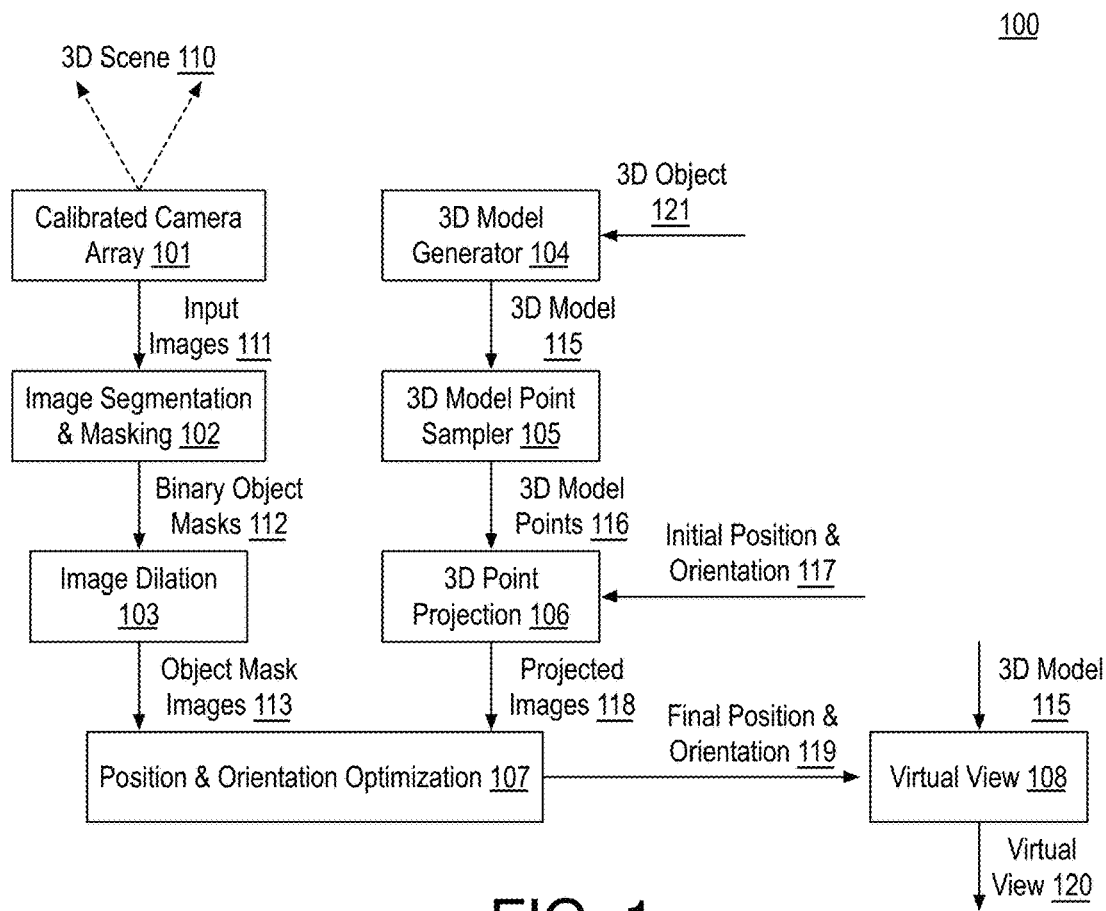
FIG. 1 illustrates an example system for embedding a 3D model of a 3D object into an augmented reality scene.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to embedding complex 3D objects into an immersive augmented reality scene based on image segmentation.

As described above, generating detailed 3D structures in a 3D scene has a variety of difficulties. In some embodiments, a 3D model is generated such that the model represents a 3D object in a scene. Typically, such 3D models are generated for objects that are expected to be largely static in the scene such as goals in a sporting event or other stationary and largely motionless objects (flags, pylons, etc.). Notably, it may be desirable to have a large amount of detail in such objects in a virtual view of the reconstructed 3D scene, which the 3D model includes. Furthermore, to set color for the object, the position of the object must be very accurate. The 3D model(s) may include any suitable data structure such as a mesh model data structure that indicates the locations of vertices of the mesh in 3D space. The model may also include texture information.

After model generation, the model is located with six or more degrees of freedom (position and orientation inclusive of x, y, z location and yaw, pitch, roll orientation or other position and orientation data structures) into a 3D model of a scene. The 3D scene may be characterized as an augmented reality, an immersive 3D scene, etc. To obtain the position and orientation of the 3D object using its given 3D structure (i.e., model), the projections of the actual 3D object in the scene are determined in two or more frames corresponding to camera views of the scene. The projections may be determined using any suitable technique or techniques such as application of a segmentation network (e.g., a convolutional neural network) to frames (e.g., corresponding to image planes) of the scene attained from the cameras. For example, the projections may be binary image masks with a first value (e.g., 1) for object pixels and a second value (e.g., 0) for non-object pixels, which also may be characterized as background pixels. The binary projections are then dilated to grayscale images to create smooth images or functions for locating the 3D model into the scene.

An initial guess of the location and orientation of the 3D model is generated and the 3D model is projected onto the frames (e.g., image planes) corresponding to the cameras for which segmentation was provided. In some embodiments, selected points on faces of the 3D model (e.g., triangles or other shapes between the vertices) are projected onto the image planes of the cameras trained on the scene using calibrated projection matrices that translate between the 3D coordinates of the scene to 2D image plane coordinates for each of the cameras. Using the two or more grayscale projection images from the segmentation, an optimization problem (inclusive of corresponding projections of the 3D model onto the image plane) is then solved to provide a final location and orientation of the 3D model within the scene such that the projection of the 3D model coincides with the segmentation frames. Ideally, the solution to the optimization problem locates all of the projected points from the 3D model within the 2D image of the object attained via the discussed masking and dilation operations. In generation of a virtual view within the 3D scene (e.g., from any available location and orientation), the located and oriented 3D model is then used as part of the scene, providing improved detail of the object as compared to generation of the object in the scene using other techniques. The located and oriented 3D model is then part of an immersive view of the scene as provided from the perspective of the virtual view.

Such techniques may be applied in any immersive 3D or augmented reality context. For example, there are many contexts and applications that require understanding of scene structure such as autonomous driving, robot navigation and/or interaction with surroundings, and full 3D reconstruction for creating free dimensional immersive videos. In such contexts and applications, one of the main tasks required for rendering a scene from a virtual camera or view is to obtain a highly accurate and stable position and orientation of complex 3D objects within the scene. The techniques discussed herein allow automatic determination of position and orientation for modeled structures of complex objects thereby saving manpower and improving accuracy. For example, as compared to current manual techniques, the techniques discussed herein provide similar or improved accuracy and, as manual techniques typically take around 30 minutes while the techniques discussed herein may be performed in real-time (e.g., on the order of 10 to 30 millisecond or less), the discussed techniques allow for the ability to broadcast multiple events simultaneously, among other advantages.

FIG. 1 illustrates an example system 100 for embedding a 3D model of a 3D object into an augmented reality scene, arranged in accordance with at least some implementations of the present disclosure. System 100 may be implemented across any number of discrete devices in any suitable manner. As shown in FIG. 1, system 100 includes a camera array 101, an image segmentation and masking module 102, an image dilation module 103, a 3D model generator 104, a 3D model point sampler 105, a 3D point projection module 106, a position and orientation optimization module 107, and a virtual view module 108. System 100 may be implemented in any number of suitable form factor devices including one or more of a server computer, a cloud computing environment, personal computer, a laptop computer, a tablet, a phablet, a smart phone, a gaming console, a wearable device, a display device, an all-in-one device, a two-in-one device, or the like. Notably, in some embodiments, camera array 101 may be implemented separately from a device implementing the remaining components of system 100. Input images 111 captured via camera array 101 include simultaneously captured images of a scene 110. As used herein, the term simultaneously captured images indicates images that are synchronized to be captured at the same or nearly the same time instance within a tolerance such as 300 ms. In some embodiments, the captured images are captured as synchronized captured video. For example, the components of system 100 may be incorporated into any multi-camera multi-processor system to deliver immersive visual experiences for viewers of a scene. Although discussed with respect to simultaneously captured images, in some embodiments, input images 111 may be captured at different times as long as they capture images of the same scene and the cameras are calibrated with respect to the scene.

Figure 2:
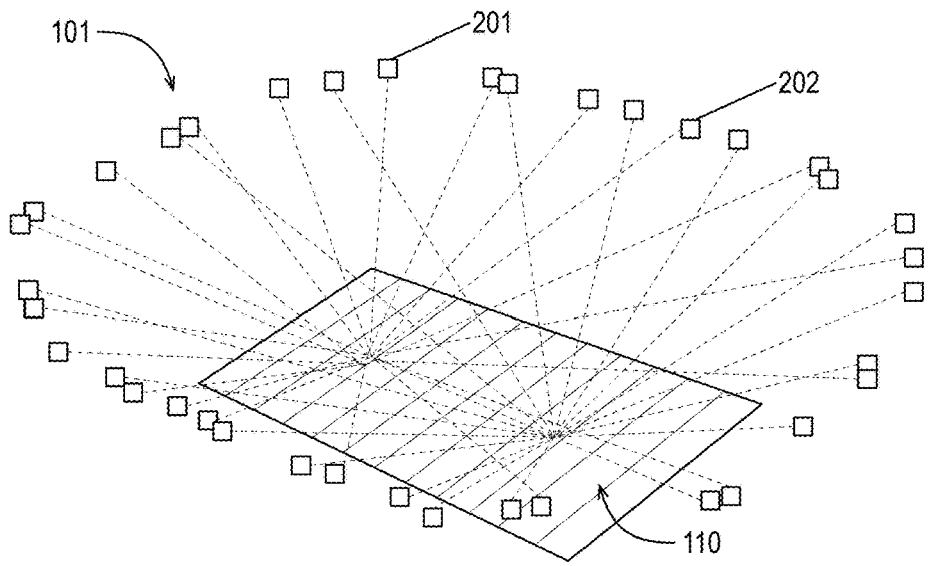
FIG. 2 illustrates an example camera array trained on an example 3D scene.

FIG. 2 illustrates an example camera array 101 trained on an example 3D scene 110, arranged in accordance with at least some implementations of the present disclosure. In the illustrated embodiment, camera array 101 includes 38 cameras trained on a sporting field. However, camera array 101 may include any suitable number of cameras trained on scene 110 such as not less than 20 cameras. For example, camera array 101 may be trained on scene 110 to generate a 3D model of scene 110 and fewer cameras may not provide adequate information to generate the 3D model. Furthermore, scene 110 may be any suitable scene such as a sport field, a sport court, a stage, an arena floor, etc. Camera array 101 may be mounted to a stadium (not shown) or other structure surrounding scene 110 and along the ground surrounding scene 110, calibrated, and trained on scene 110 to capture images or video. As shown, each camera of camera array 101 has a particular view of scene 110. For example, camera 201 has a first view of scene 110, camera 202 has a second view of scene 110, and so on. As used herein, the term view indicates the image content of an image plane of a particular camera of camera array 101 or image content of any view from a virtual camera located within scene 110. Notably, the view may be a captured view (e.g., a view attained using image capture at a camera) such that multiple views include representations of the same person, object, entity, etc. Furthermore, each camera of camera array 101 has an image plane that corresponds to the image taken of scene 110.

With reference to FIG. 1, the techniques discussed herein insert a 3D model of a 3D object within scene 110 for an improved virtual view within scene 110. That is, the 3D model is generated with enhanced detail with respect to what may be attained using imaging and reconstruction techniques. In the point cloud or other volumetric model of scene 110, the 3D model is located and included in the point cloud or other volumetric model and viewpoints that include the 3D model (and 3D object) are generated using the 3D model for an improved immersive experience. To locate the 3D model within the scene, the location (e.g., x, y, z coordinates) and orientation (e.g., yaw, pitch roll values) of the 3D model are determined. The discussed techniques provide an automatic method for providing a highly accurate and precise position and orientation of a complex 3D model based on segmentation of 2D images including representations of the 3D object such that the 2D images are attained by two or more cameras of camera array 101. Notably, such techniques can be advantageously applied to even un-textured complex 3D models.

Camera array 101 attains two or more input images 111 each corresponding to a particular camera of camera array 101. Notably, two input images 111 may be employed to perform the techniques discussed herein, but more input images 111 provide greater accuracy and stability. Furthermore, the following techniques are discussed with respect to locating and orienting a single 3D model for a corresponding 3D object 121 within scene 110. However, any number of 3D models each corresponding to a particular 3D object may be located and oriented within scene 110. The discussed techniques may be performed prior to real-time video capture and point cloud generation or they may be performed in real time. In some embodiments, a previously determined 3D model location may be altered or refined at particular intervals (e.g., every minute, every 5 minutes, etc.) during real-time image capture such that the discussed techniques are performed in real-time (e.g., after a particular video frame capture time instance and prior to a next video frame capture time instance).

For each such 3D object 121, a 3D model 115 is generated as shown with respect to 3D model generator 104. Herein, the term object is used to indicate an actual real world object while the term model is used to indicate a data structure representative of the object. The modeled 3D object 121 may be any object within scene 110. It is noted that generally static objects with higher levels of detail may be benefited to a greater degree from 3D modeling as the cameras may have greater difficulty attaining such detail while the static nature of the 3D object does not require much if any change to the object in real time. In some embodiments, 3D model 115 is a rigid model of 3D object 121 such that no movement of components of 3D model is provided and, within scene 110, 3D model 115 is fully defined with 6 degrees of freedom: 3 for location and 3 for orientation. Although discussed herein with respect to x-, y-, and z-coordinates indicating location and yaw, pitch, and roll values indicating orientation, any coordinate systems may be used. For example, a coordinate system is applied to scene 110 and objects and models may be located and oriented within the scene using the applied coordinate system.

Although illustrated herein with respect to a rigid 3D model, in some embodiments, 3D model 115 is a non-rigid model having components or segments thereof that can move with respect to one another. In some embodiments, 3D model 115 is a non-rigid 3D model including one or more degrees of freedom for movements between 3D segments of 3D model 115. Such movement may be around joints, linear along a defined axis, rotation around a defined axis, etc. In some embodiments, such intra-model movement may be constrained within defined ranges. Notably, the techniques discussed herein can be extended to such non-rigid or complex models having ensembles of parts, components, segments, or objects by allowing the degrees of freedom associated with the parts to change during positioning and orientation optimization as discussed herein. That is, the discussed 6 degrees of freedom may be extended to include other degrees of freedom for locating and orienting parts of 3D model 115 during such optimization. In some embodiments, determining a final position and orientation of 3D model 115 (as discussed herein below) includes determining final parameters for the one or more degrees of freedom for the movements between segments based on optimization of a cost function. The initial estimates for such parameters may be based on a neutral state of 3D model 115 or based on prior 3D scene build or the like.

For any given 3D object 121, 3D model 115 is generated using any suitable technique or techniques. In some embodiments, 3D model 115 is generated via a LIDAR scan of 3D object 121. In some embodiments, 3D model 115 is generated via manual fitting in 3D rendering software based on multiple images from calibrated cameras (camera array 101 or another camera grouping or array) taken of 3D object 121. Furthermore, 3D model 115 may have any suitable data structure. In some embodiments, 3D model 115 is represented by a 3D object mesh data structure inclusive of positions in 3D space of vertices and faces of the mesh. In some embodiments, 3D model 115 is a mesh object model having indices representative of 3D object 121 and faces between and defined by the indices. Furthermore, 3D model 115 may include texture information corresponding to such vertices and the faces (e.g., triangular faces of the vertices), however such texture information is not needed to locate and orient 3D model 115 using the techniques discussed herein. For example, the discussed techniques may be applied to textured or non-textured models.

Figure 3:
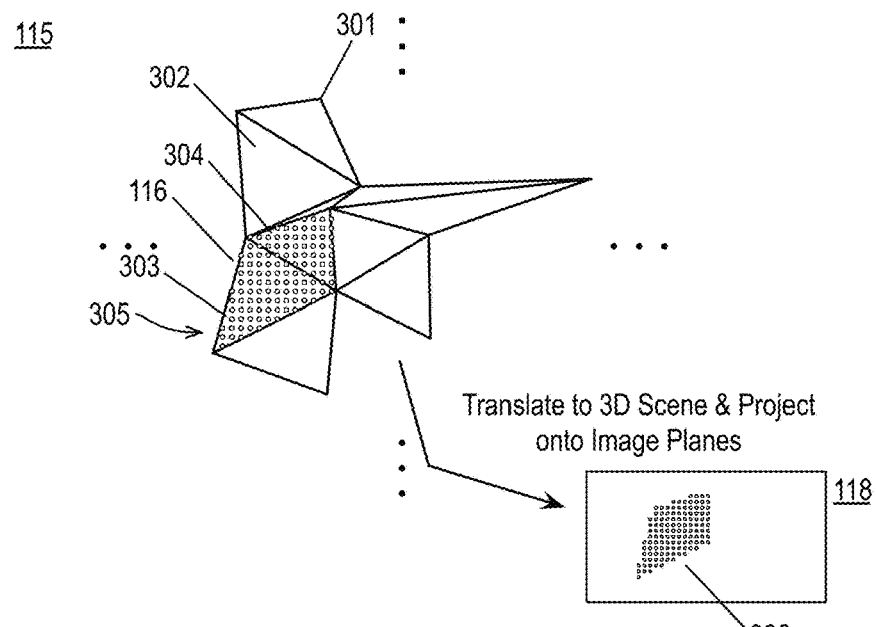
FIG. 3 illustrates a portion of an example 3D model.

FIG. 3 illustrates a portion of an example 3D model 115, arranged in accordance with at least some implementations of the present disclosure. As shown, 3D model 115 includes a large number of vertices such as vertex 301 and faces such as faces 302, 303, 304 defined between the vertices. In the illustrated example, 3D model 115 is a triangular mesh model such that the faces are each triangular in shape. 3D model 115 represents 3D object 121 by varying the locations of the vertices to approximate surfaces and edges of 3D object 121. Using a dense mesh, high quality 3D models are attainable and provide highly realistic virtual views when inserted and replicated within 3D scene 110.

Returning to FIG. 1, discussion now turns to processing input images 111. In the following, a single image is illustrated and discussion is directed to processing of a single image. However, the discussed techniques are performed for any number of input images 111 (i.e., two or more input images 111). Image segmentation and masking module 102 receives input images 111, which include at least a portion of a 2D representation of 3D object 121. Image segmentation and masking module 102 generates, for each of input images 111, a corresponding binary object mask 112 such that each binary object mask 112 includes a first pixel value (e.g., 1) for pixels determined to be within the 2D representation of 3D object 121 and a second pixel value (e.g., 0) for pixels determined to be outside of the 2D representation of 3D object 121.

Image segmentation and masking module 102 may generate binary object mask 112 using any suitable technique or techniques. In some embodiments, image segmentation and masking module 102 applies a pretrained convolutional neural network (CNN) to each of input images 111 such that the output of the CNN provides a probability of whether each pixel (or a group of pixels) is a part of the 2D representation of 3D object 121. Such values may then be thresholded to generate binary object masks 112. Other segmentation techniques are available and may be applied by image segmentation and masking module 102.

Figure 4:
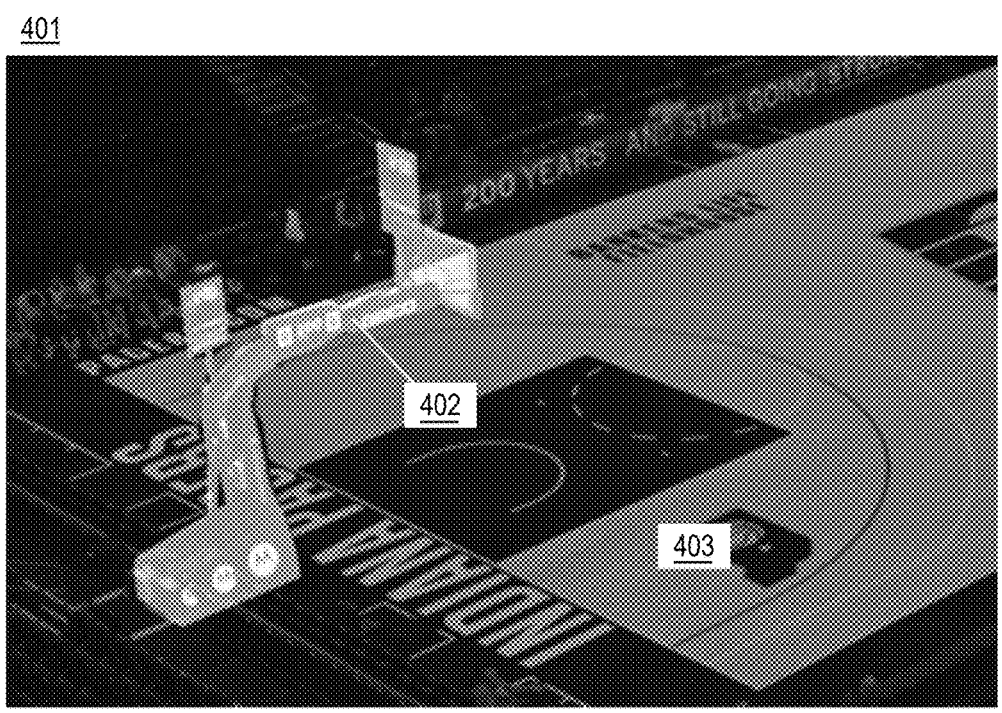
FIG. 4 illustrates an example segmentation image generated based on a corresponding input image.

FIG. 4 illustrates an example segmentation image 401 generated based on a corresponding input image, arranged in accordance with at least some implementations of the present disclosure. As shown, image segmentation and masking module 102 is applied to provide image regions or segments 402 that are deemed to be included in the 2D projection of 3D object 121 (or have a high probability thereof), which is illustrated as a basketball stanchion and goal in this example, and a background region 403. As discussed, such segmentation is provided for each of input images 111 using any suitable technique or techniques such as application of a pretrained CNN.

Figure 5:
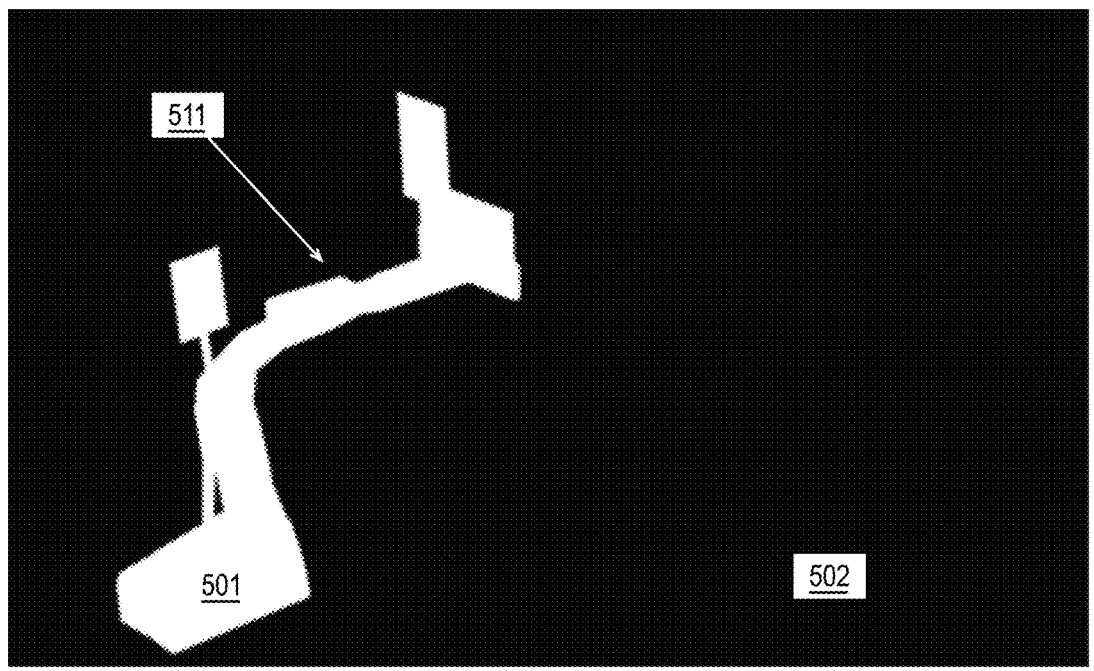
FIG. 5 illustrates an example binary object mask generated based on a corresponding input image.

FIG. 5 illustrates an example binary object mask 112 generated based on a corresponding input image, arranged in accordance with at least some implementations of the present disclosure. As shown, image segmentation and masking module 102 generates binary object mask 112 such that binary object mask 112 includes first pixel values 501 (e.g., pixel values of 1) for those pixels deemed to be part of a 2D representation 511 of 3D object 121, which may be characterized as object pixels or the like, and second pixel values 502 (e.g., pixel values of 0) for those pixels deemed to be outside of 2D representation 511 of 3D object 121, which may be characterized as background pixels or non-object pixels or the like.

Returning to FIG. 1, each binary object mask 112 is received by image dilation module 103, which applies dilation, a reverse distance transform, or other blurring technique to each binary object mask 112 to generate a corresponding object mask image 113. In some embodiments, object mask images 113 are grayscale images. For example, with reference to FIG. 5, in some embodiments, dilation processing maintains a maximum value for first pixel values 501 and provides a gradient extending from the edges defined by first pixel values 501 (and 2D representation 511) into the background region defined by second pixel values 502. Such techniques offer advantages in subsequent position and orientation optimization processing. For example, such dilation processing provides for faster convergence. Furthermore, such dilation processing may avoid grid searching techniques being necessary in contexts where the initial position is inaccurate.

Figure 6:
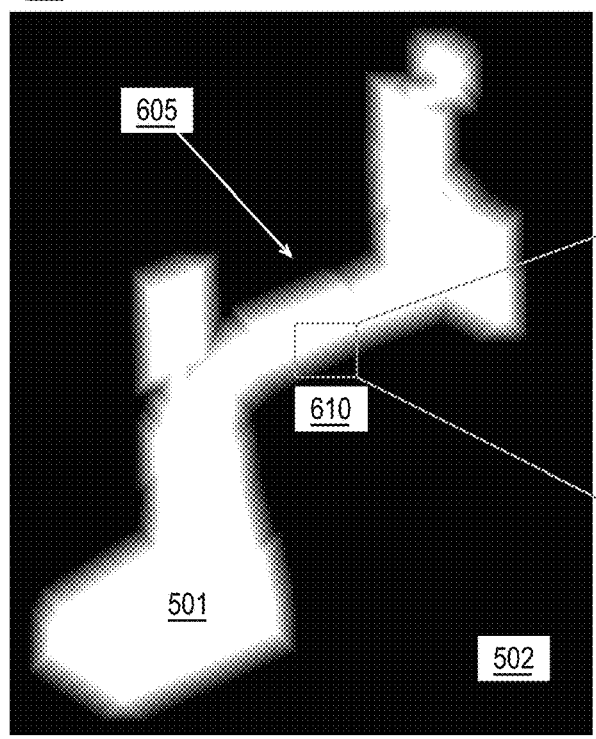
FIG. 6 illustrates an example object mask image generated based on a corresponding input image.
Figure 6:
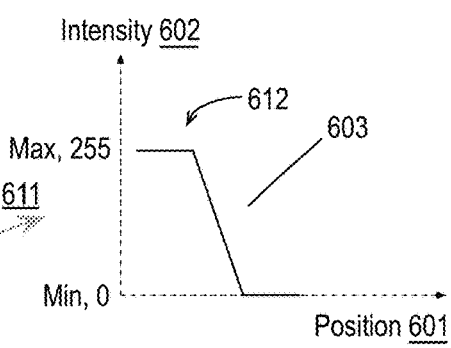
Figure 6:
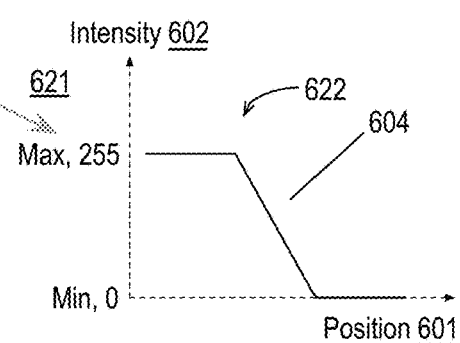

FIG. 6 illustrates an example object mask image 113 generated based on a corresponding input image, arranged in accordance with at least some implementations of the present disclosure. As shown, object mask image 113 includes a dilated 2D representation 605 having first pixel values 501 as with binary object mask 112 such that first pixel values 501 may be maximum values in the grayscale of object mask image 113 (e.g., values of 255). Similarly, object mask image 113 includes second pixel values 502 as with binary object mask 112 for those pixels that are beyond a particular distance from an edge of 2D representation 511 (e.g., from edges in binary object mask 112) as shown with respect to dilated 2D representation 605. For example, second pixel values 502 may be minimum values in the grayscale of object mask image 113 (e.g., values of 0). Between such first pixel values 501 and second pixel values 502, an edge gradient 610 is provided via dilation, reverse distance transform, or other blurring.

As shown, in a first example 611, edge gradient 610 is provided such that pixel values or intensities 602 have a particular profile 612 with respect to pixel position 601. In the context of FIG. 6, pixel position 601 is defined as extending from a position within an object, across an object boundary (e.g., across a detected object boundary) along a direction orthogonal (or nearly orthogonal) to the object boundary, and to a position outside of the object. As shown, profile 612 provides for reduction in pixel intensity 602 from a maximum value (e.g., 255 fully within the object) to a minimum value (e.g., 0 fully outside the object) as discussed. In first example 611, profile 612 includes a linear portion 603 extending from the maximum value to the minimum value. Although illustrated with respect to linear portion 603, any monotonically decreasing function may be used. As shown, the dilating operation includes generating an increasing gradient in binary object mask 112 (e.g., a segmented image) in a portion of the pixels outside of dilated 2D representation 605 (e.g., outside an object) toward pixels within dilated 2D representation 605.

In some embodiments, for each application, a constant or same dilation operation and resultant edge gradient is applied, as illustrated with respect to first example 611. That is, constant dilation may be applied regardless of input images or other processing parameters. In other embodiments, different amounts of dilation are provided and differing resultant edge gradients are attained based on the confidence in an initial estimation of the position and orientation of 3D model 115 within scene 110. For example, the initial estimation of the position and orientation of 3D model 115 may be attained using any suitable technique or techniques. In some embodiments, the initial position and orientation of the 3D model is set as a prior final position and orientation of the 3D model in a prior modeling of the 3D scene. For example, for sporting events, the same arena may be modeled repeatedly with some variation in the scene. In some embodiments, an earlier modeling of the scene is performed to provide the position and orientation of a (prior) 3D model. A current modeling of the scene then uses the final position and orientation of the (prior) 3D model (either the same model or a like model) form the earlier modeling as the initial position and orientation for optimization in the current modeling. Such techniques provide high confidence in the initial position and orientation of (prior) 3D model in scene 110. In such contexts or other high confidence contexts, little or no dilation may be applied. However, in other contexts no such earlier modeling is available or other mitigating factors may intervene to cause the initial position and orientation to be less likely to be accurate or for the confidence in the initial position and orientation to be lower.

Although discussed with respect to earlier modeling, the initial position and orientation may have higher or lower confidence based on any suitable factors. Notably, the amount of dilation (or gradient) is altered based on the confidence in the initial position and orientation of 3D model 115 in scene 110. In some embodiments, an initial position and orientation confidence value (e.g., ranging from 0 indicating no confidence to 10 indicting high confidence or within any other range) is generated and the dilation is performed dependent on the position and orientation confidence value with lower dilation or blurring provided in high confidence applications and higher dilation or blurring provided in high confidence applications.

For example, in a second example 621, edge gradient 610 is provided such that pixel values or intensities 602 have a particular profile 622 with respect to pixel position 601. As shown, profile 622 again provides for reduction in pixel intensity 602 from a maximum value (e.g., 255 fully within the object) to a minimum value (e.g., 0 fully outside the object). However, as compared to first example 611, in second example 621, profile 622 includes a linear portion 604 extending from the maximum value to the minimum value that has a lesser slope with respect to first example 611. In this context the slope is defined as a change in pixel value or intensity over change in pixel position (e.g., pixel value change over pixel distance change).

Thereby, differing gradients are provided such that, in high confidence initial position and orientation contexts, a higher slope (and less blur in terms of distance) is provided to increase speed in convergence by taking advantage of the presumably more accurate initial position and orientation. Furthermore, noise rejection is improved. In low confidence initial position and orientation contexts, a lesser slope (and greater blur in terms of distance) is provided to increase the likelihood of capturing the projection of 3D model points (as discussed below) within the blur at the cost of slower convergence.

Returning to FIG. 1, object mask images 113 are provided to position and orientation optimization module 107. Object mask images 113 provide blurred grayscale 2D representations of 3D object 121 on the image planes of two or more cameras of camera array 101. Object mask images 113 are used as a guide to determine a final position and orientation 119 for 3D model 115 as discussed herein below. Turning now to 3D model point sampler 105, 3D model point sampler 105 receives 3D model 115 and samples points from 3D model 115 for use in adjusting the position and orientation of 3D model point sampler 105 to fit into object mask images 113 and 3D model point sampler 105 provides such points as 3D model points 116.

Such sampling by 3D model point sampler 105 to generate 3D model points 116 may be performed using any suitable technique or techniques. In some embodiments, a dense point field is applied to faces (e.g., all faces or faces expected to be in the 2D view) of 3D model 115 and each point (e.g., the 3D location of each point) is used as part of 3D model points 116. For example, a dense point field may be applied at a particular point density and the 3D location of each point may be included in 3D model points 116. In addition, each vertex of 3D model 115 may be used as a part of 3D model points 116. However, vertices alone do not typically provide enough point density for use in position and orientation optimization as discussed herein.

With reference now to FIG. 3, a dense point field 305 is illustrated as applied to face 303 and face 304. Dense point field 305 may also be applied to face 302 and other faces but such application is not illustrated in FIG. 3 for the sake of clarity of presentation. As discussed, the position in 3D space of each point of dense point field 305 is determined and provided in 3D model points 116.

Returning to FIG. 1, 3D model points 116 are received by 3D point projection module 106, which projects 3D model points 116 onto each camera plane corresponding to object mask images 113. That is, for each of object mask images 113, a projection is made onto the corresponding image plane. Such projections may be made using any suitable technique or techniques. In some embodiments, the projections (e.g., onto multiple image planes) of each of 3D model points 116 includes determination of a 3D location of each of 3D model points 116 in the 3D scene using an initial position and orientation 117 of 3D model 115 and projection from the 3D location onto image planes using projection matrices corresponding thereto. As discussed, initial position and orientation 117 may be determined using any suitable technique or techniques. In some embodiments, initial position and orientation 117 is a final position and orientation of a 3D object corresponding to 3D object generated based on a prior reconstruction of scene 110. Although illustrated with respect to 3D point projection module 106 being a separate module and providing projected image 118 to position and orientation optimization module 107, in some embodiments, 3D point projection module 106 is not employed and such techniques are performed by position and orientation optimization module 107 during optimization.

With reference to FIG. 3, 3D model points 116, as determined based on dense point field 305 are translated into the 3D scene (using position and orientation information for 3D model 115) and projected onto the image plane of each camera of camera array 101 corresponding to one of object mask images 113 (and input images 111) to provide projected 3D model points 306 projected image 118. Such projected 3D model points 306 are then compared with projected dilated object images (e.g., object mask images 113) to adjust the position and orientation information and determine a final position and orientation for 3D model 115.

Returning to FIG. 1, for example, each of 3D model points 116 is first projected or located in scene 110 using initial position and orientation 117. It is noted that, in iterative processing examples or refinement examples, a current position and orientation of 3D model 115 is used in place of initial position and orientation 117. After location of the point in scene 110, the point is then projected onto each pertinent image plane using the (previously calibrated) projection matrix that translates between 3D points in scene 110 and 2D points on the image plane for each camera of camera array 101.

Notably, using initial position and orientation 117, which includes a parameter for each of the number of degrees of freedom of 3D model 115 (e.g., 6 degrees of freedom for rigid models: x, y, z, yaw, pitch, roll or the like), the projection of 3D model 115 is provided in two or more camera views provided by camera array 101. The points of 3D model 115 as provided by 3D model points 116 are then projected onto the image planes of those camera views. The selection of 3D model points 116 is made such that, when initial position and orientation 117 is accurate, the projected points are at least sparsely distributed within the 2D representation of 3D object 121 in object mask images 113.

Figure 7:
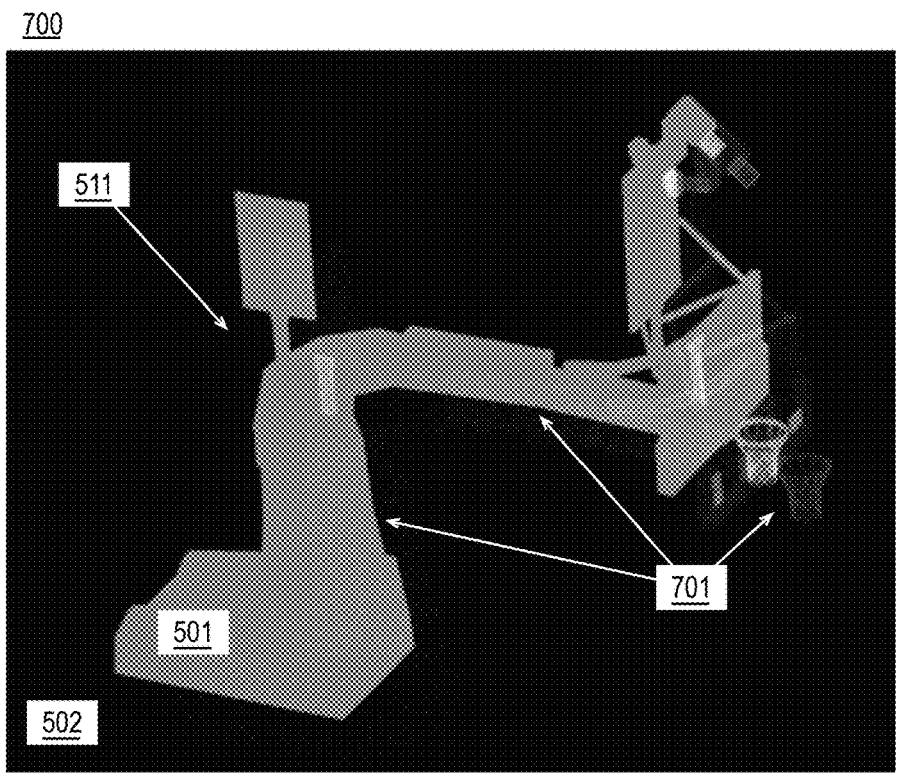
FIG. 7 illustrates an example overlay of projected 3D model points with a 2D representation of a 3D object.

FIG. 7 illustrates an example overlay 700 of projected 3D model points 701 with 2D representation 511 of 3D object 121, arranged in accordance with at least some implementations of the present disclosure. As shown, projected 3D model points 701 (illustrated as white dots) partially overlap with 2D representation 511 (illustrated in grey) such that some of projected 3D model points 701 are within 2D representation 511 while others are outside of 2D representation 511. Those outside of 2D representation 511 can be seen most clearly with respect to the rim and net of example 2D representation 511. The projected points inside of 2D representation 511 are, although within 2D representation 511, not perfectly aligned therewith.

Figure 8:
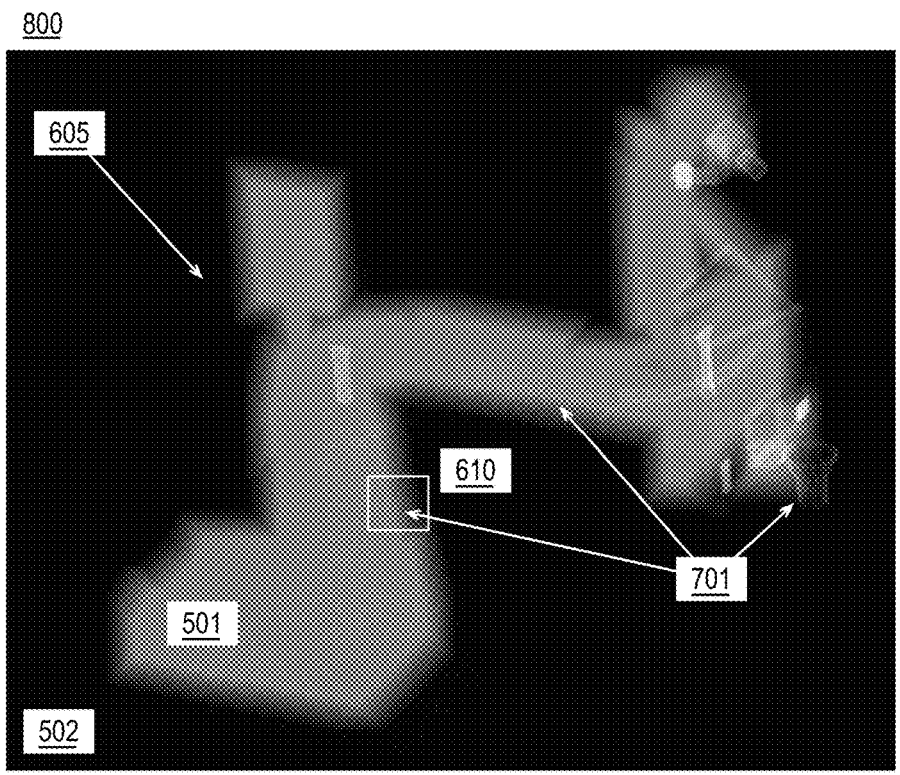
FIG. 8 illustrates an example overlay of projected 3D model points with a dilated 2D representation of a 3D object.

FIG. 8 illustrates an example overlay 800 of projected 3D model points 701 with dilated 2D representation 605 of 3D object 121, arranged in accordance with at least some implementations of the present disclosure. As shown, projected 3D model points 701 (illustrated again as white dots) partially (but more fully with respect to 2D representation 511) overlap with dilated 2D representation 605 (illustrated in grey) such that more of projected 3D model points 701 are within dilated 2D representation 605. Notably, such dilation provides for more overlap and better chance at convergence particularly as misalignment of projected 3D model points 701 with one of 2D representation 511 and dilated 2D representation 605 becomes more severe.

Returning to FIG. 1, position and orientation optimization module 107 receives object mask images 113 and projected images 118 and position and orientation optimization module 107 generates a final position and orientation 119 for 3D model 115 such that final position and orientation 119 includes a value or parameter for each degree of freedom of 3D model that optimizes a cost function that compares object mask images 113 and versions of projected images 118 based on current position and orientation of 3D model 115. That is, position and orientation optimization module 107 determines final position and orientation 119 of 3D model 115 in 3D scene 110 based on optimization of a cost function that compares object mask images 113 to the projected 3D points on the image planes corresponding to object mask images 113. The optimization of the cost function may include any suitable optimization such as minimization of a piecewise linear function including a sum of differences between a maximum value of object mask images 113 differenced with a value of the object mask images corresponding to projections of each of 3D model points 116 onto object mask images 113 as discussed further herein below. Although discussed with respect to optimization of a cost function, final position and orientation 119 may be generated using other techniques such as excessive grid search. However, such techniques suffer from large computation costs.

Notably, the goal is to find a translation, T, and a rotation, R, that, after transforming 3D model points 116 and projecting them onto the image planes of all cameras corresponding to object mask images 113, fits, as much as possible, all projected points within the 2D representation of the image on the image planes. For example, the 2D projection $p_j$ a each 3D model point 116 $r_j$ on a calibrated camera image plane having a projection matrix $C_i$ is provided as shown in Equation (1):

$$p_{ij} = C_i(Rr_j + T) \qquad (1)$$

where $p_{ij} \in \mathbb{R}^2$ is the 2D projection of the $j^{th}$ 3D model point 116 onto the $i^{th}$ image plane (e.g., $i^{th}$ camera of camera array 101), $C_i$ is the projection matrix for the $i^{th}$ camera, R represents the rotation parameters for 3D model 115 to orient 3D model 115 in scene 110, $r_j$ is the $j^{th}$ 3D model point 116, and T represents the translation parameters for 3D model 115 locate 3D model 115 in scene 110.

Each of object mask images 113 (e.g., dilated-mask images) then provides a function $I_i: \mathbb{R}^2 \to \mathbb{R}$ that can be evaluated using, for example, a bi-cubical interpolator. Notably, each of object mask images 113 can be evaluated to determine a value for each projected 3D model point 701. The result provides a maximum value when projected 3D model point 701 is within 2D representation 511 (e.g., within the object mask and having first pixel values 501), a minimum value when projected 3D model point 701 is fully outside of dilated 2D representation 605 (e.g., fully outside even the dilated object mask and having second pixel values 502), or a value therebetween when within gradient 610. Thereby, the 3D model 115, based on current translation, T, and a rotation, R, can be penalized when projected 3D model points 701 are outside the object mask (and not penalized or penalized less when projected 3D model points 701 are inside the object mask or the dilation thereof).

For example, for each object mask image 113 and the projected 3D model points 701 corresponding thereto, a piecewise-differentiable function (e.g., a cost function to be optimized), $f_i$, is defined to determine how close projected 3D model points 701 (e.g., the projections) are to the 2D representation in the object mask images 113 (e.g., the dilated mask), please refer to FIG. 8. For example, given a maximum value in each object mask image 113 (e.g., 255 in grayscale applications) of M, the cost function is provides as shown in Equation (2):

$$f_i = \sum_j (M - I_i(pij)) = \sum_j (M - I_i(C_i(Rr_j + T))) \qquad (2)$$

where $f_i$ is the cost function for the $i^{th}$ camera (or image plane), M is the maximum value, $I_i$ is the value in the $i^{th}$ object mask image 113 for each projected 3D model points 701, which is summed over each of the j 3D model points 116.

The resultant final position and orientation 119 are then determined by minimizing the cost functions over all of the i image planes or cameras. Any suitable summation of such cost functions may be used such as a 2nd order error approximation as shown in Equation (3):

$$\min_{R,T} \sum_i \|f_i\|^2 = \min_{R,T} \sum_i \left\| \sum_j (M - I_i(C_i(Rr_j + T))) \right\|^2 \quad (3)$$

where R and T provide final position and orientation 119 for 3D model 115 by minimizing the discussed cost functions. Equation (3) may be optimized using any suitable technique or techniques. For example, Equation (3) may be optimized using non-linear least squares solvers and/or optimizers. In some embodiments, each projection of each of 3D model points 116 falls within at least dilated 2D representation 605. In some embodiments, each projection of each of 3D model points 116 falls within 2D representation 511.

Figure 9:
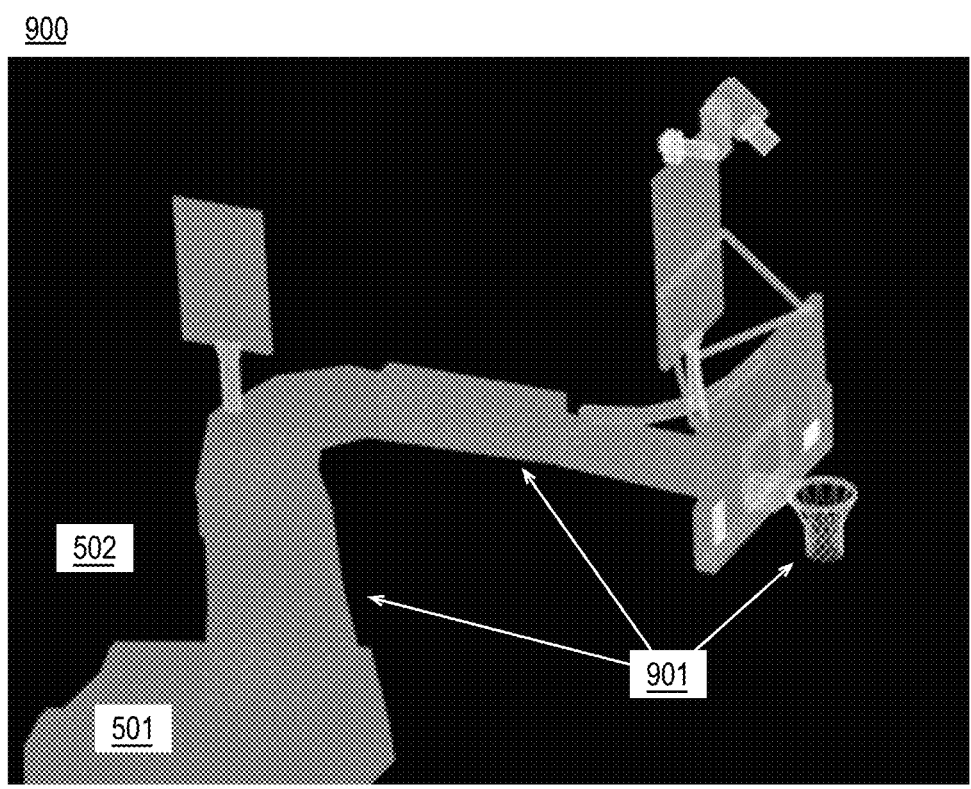
FIG. 9 illustrates an example overlay of projected 3D model points based on a final position and orientation of a 3D model with a 2D representation of a 3D object.

FIG. 9 illustrates an example overlay 900 of projected 3D model points 901 based on a final position and orientation of 3D model 115 with 2D representation 511 of 3D object 121, arranged in accordance with at least some implementations of the present disclosure. As shown, projected 3D model points 901 (illustrated as white dots) fully or almost fully overlap with and are within 2D representation 511 (illustrated in grey). Thereby, when generating a virtual view within scene 110, 3D model 115 is properly located and oriented. Furthermore, as compared to a 3D object representation generated solely based on attained images, 3D model 115 has improved detail and texture.

Returning to FIG. 1, virtual view module 108 receives 3D model 115 and final position and orientation 119. Virtual view module 108 receives other data pertinent to generate a virtual view 120 within scene 110 such as a desired virtual camera location and view, point cloud data for other objects or a full point cloud inclusive of the other objects (into which 3D model may be inserted). Based on such received data, virtual view module 108 generates a photo realistic view for virtual view 120 within scene 110 from a given location and orientation therein based a view of point cloud or volumetric model inclusive of 3D model 115, which is located and oriented based on final position and orientation 119. For example, the point cloud or volumetric model may be rendered and painted with texture captured via input image 111. Virtual view 120 may be generated at every frame instance (or every other) to provide an immersive experience for a user. Furthermore, the virtual view can be navigated in the 3D space of scene 110 to provide a multiple degree of freedom user experience.

Figure 10:
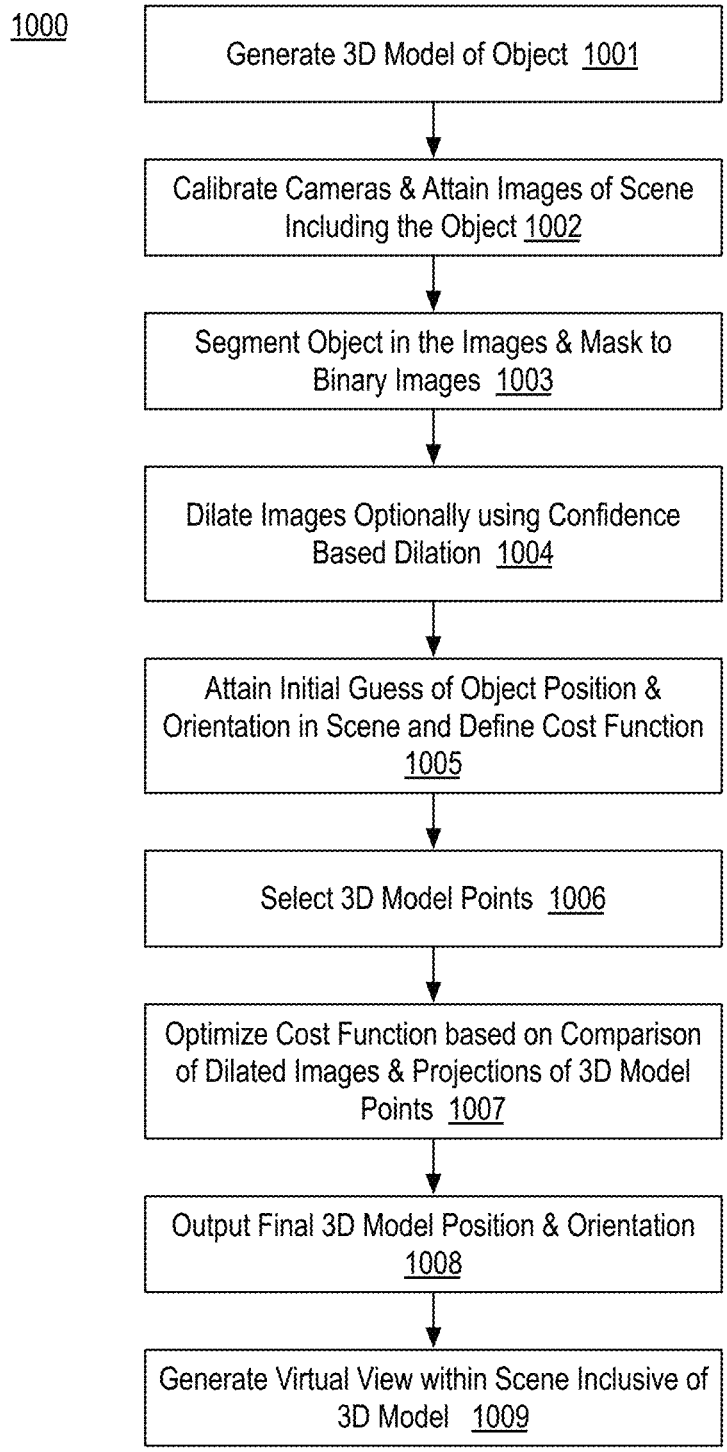
FIG. 10 illustrates an example process for embedding a 3D model of a 3D object into an augmented reality scene.

FIG. 10 illustrates an example process 1000 for embedding a 3D model of a 3D object into an augmented reality scene, arranged in accordance with at least some implementations of the present disclosure. Process 1000 may include one or more operations 1001-1009 as illustrated in FIG. 10. For example, operations 1001-1009 may be performed by system 100 to generate virtual view 120.

Process 1000 begins at operation 1001, where a 3D model of an object is generated using any suitable technique or techniques such as a LIDAR scan of the object, fitting a model to the object, or the like. The 3D model may have any suitable data structure such as a mesh data structure indicating vertices of a 3D mesh with the vertices defining triangle faces therebetween. Processing continues at operation 1002, where cameras of a camera array are installed around a scene and calibrated using any suitable technique or techniques and two or more images of the scene including the object modeled at operation 1001 are attained. As discussed, at least two images are needed to perform the following techniques although more images provide greater accuracy. In some embodiments, five to twenty images are used.

Processing continues at operation 1003, where 2D representations of the object in the attained images are segmented or detected using any suitable technique or techniques such as application of a segmentation CNN and binary masks of the detected 2D representations are generated. For example, the segmentation CNN may be applied to each of the attained images and resultant per pixel likelihood data may be thresholded to generate the binary images.

Processing continues at operation 1004, where the binary masks are dilated to generate dilated object masks. As shown, the dilation may be based on the confidence of an initial position and orientation of the 3D model in the scene. For example, for higher confidence initial position and orientation, a lower amount of dilation may be applied and for lower confidence initial position and orientation, a higher amount of dilation may be applied. In some embodiments, dilating the binary mask images includes applying a first gradient or a second gradient responsive to a first initial position and orientation confidence value or a second initial position and orientation confidence value less than the first initial position and orientation confidence value, respectively, such that the first gradient has a greater slope in pixel value change over pixel distance change than the second gradient.

Processing continues at operation 1005, where the initial position and orientation of the 3D model is received and a cost function is defined. The 3D cost function may be any cost function discussed herein. In some embodiments, the 3D cost function provides a value for each point projected from the 3D model (based on the position and orientation of the 3D model and the projection matrix for each camera) that is equal to the difference between the maximum available value in the dilated object masks (e.g., 255) and the output value from the dilated object mask for the projected point. That is, the difference is zero when the point is projected within the object mask, the difference is one when the point is projected outside the dilated object mask, and a value therebetween when the point is projected within an edge gradient between the object mask and a background region.

Processing continues at operation 1006, where 3D model points are selected for evaluation using any suitable technique or techniques. In some embodiments, the vertices of the 3D model are included in the 3D model points and points from a number (or all) of the faces of the 3D model are included in the 3D model points. In some embodiments, only points from the faces are used. For example, each face of the 3D model may be sampled and the 3D locations of the sample points may be employed as the 3D model points.

Processing continues at operation 1007, where the cost function defined at operation 1005 is optimized based on comparison of the dilated images generated at operation 1004 and the projections of the 3D model points selected at operation 1006. In some embodiments, each of the 3D model points selected at operation 1006 are projected onto the image planes of the dilated images and the dilated images are evaluated at that position to determine a value for 3D model point. The maximum value of the dilated images is then differenced with the determined value and each those differences are summed across all 3D model points projected onto all of the image planes of the dilated images. As discussed, the difference is zero when the point is projected within the object mask, the difference is one when the point is projected outside the dilated object mask, and a value therebetween when the point is projected within an edge gradient between the object mask and a background region. The cost function may then be solved to optimize the location (or translation) and orientation parameters using the dilated object masks as function to translate the projected 3D model points to a cost or penalty values. The result of the solved or optimized cost function is the final position and orientation of the 3D model within the scene.

Processing continues at operation 1008, where the final position and orientation of the 3D model are output for use in any suitable context such as reconstruction of the 3D scene, autonomous driving applications, robot navigation and/or interaction applications, augmented reality applications, or the like. Processing continues at operation 1009, where the final position and orientation of the 3D model are used to generate a virtual view within a scene inclusive of the 3D model. For example, a point cloud representation of the 3D scene may be generated inclusive of the 3D model having the final position and orientation and the virtual veew may be determined based on the point cloud representation of the 3D scene.

Figure 11:
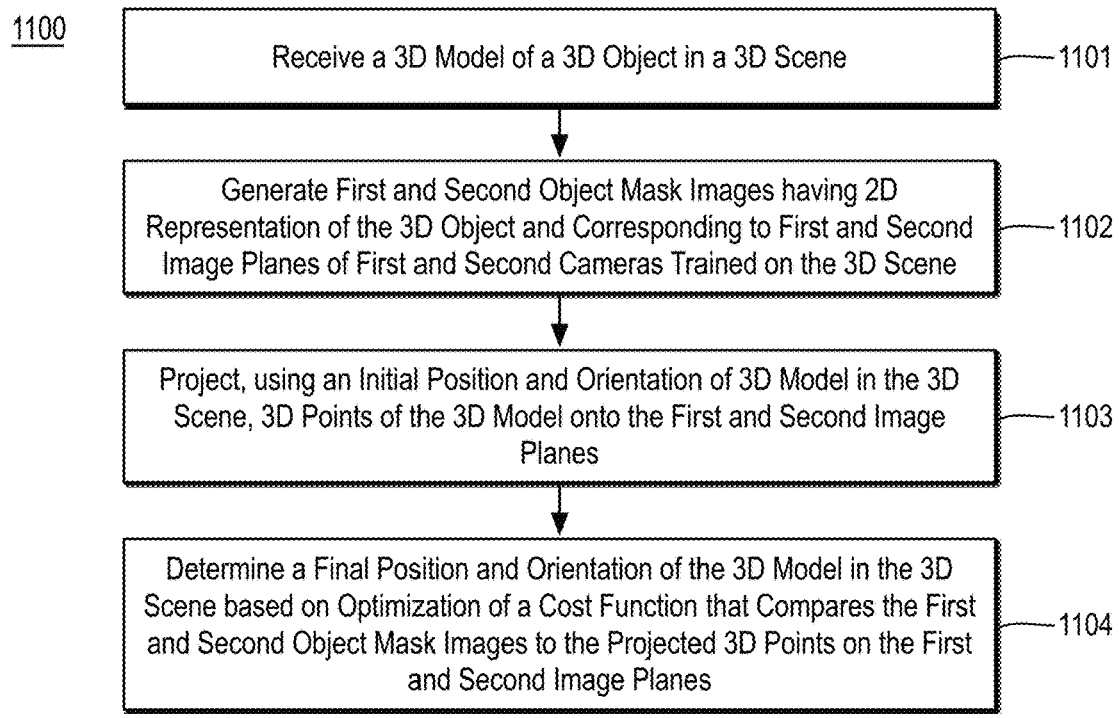
FIG. 11 is a flow diagram illustrating an example process for generating a virtual view within a 3D scene.

FIG. 11 is a flow diagram illustrating an example process 1100 for generating a virtual view within a 3D scene, arranged in accordance with at least some implementations of the present disclosure. Process 1100 may include one or more operations 1101-1104 as illustrated in FIG. 11. Process 1100 may form at least part of a virtual view generation process for immersive video or augmented reality, for example. By way of non-limiting example, process 1100 may form at least part of a process as performed by system 100 as discussed herein. Furthermore, process 1100 will be described herein with reference to system 1100 of FIG. 11.

Figure 12:
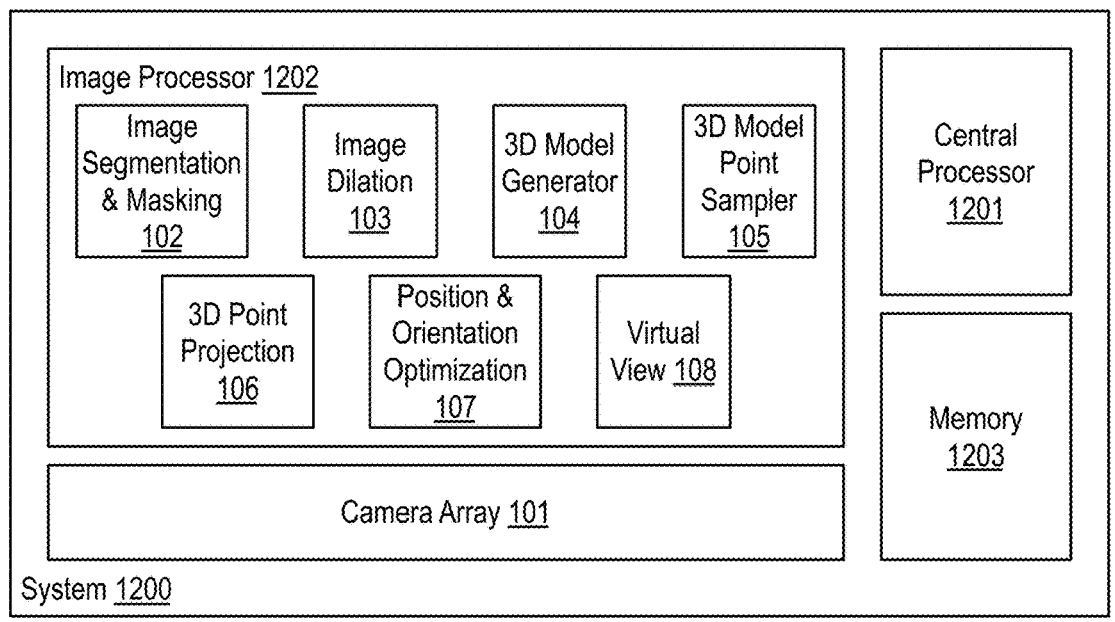
FIG. 12 is an illustrative diagram of an example system for generating a virtual view within a 3D scene.

FIG. 12 is an illustrative diagram of an example system 1200 for generating a virtual view within a 3D scene, arranged in accordance with at least some implementations of the present disclosure. As shown in FIG. 12, system 1200 may include a central processor 1201, an image processor 1202, a memory 1203, and camera array 101. Also as shown, image processor 1202 may include or implement image segmentation and masking module 102, image dilation module 103, 3D model generator 104, 3D model point sampler 105, 3D point projection module 106, position and orientation optimization module 107, and virtual view module 108. In the example of system 1200, memory 1203 may store input images, binary object mask data, object mask image data, 3D model data, selected 3D model points, projected images, positions and orientations, virtual view data, or any other data discussed herein.

As shown, in some examples, one or more or portions of image segmentation and masking module 102, image dilation module 103, 3D model generator 104, 3D model point sampler 105, 3D point projection module 106, position and orientation optimization module 107, and virtual view module 108 are implemented via image processor 1202. In other examples, one or more or portions of image segmentation and masking module 102, image dilation module 103, 3D model generator 104, 3D model point sampler 105, 3D point projection module 106, position and orientation optimization module 107, and virtual view module 108 are implemented via central processor 1201, an image processing unit, an image processing pipeline, an image signal processor, or the like. In some examples, one or more or portions of image segmentation and masking module 102, image dilation module 103, 3D model generator 104, 3D model point sampler 105, 3D point projection module 106, position and orientation optimization module 107, and virtual view module 108 are implemented in hardware as a system-on-a-chip (SoC). In some examples, one or more or portions of image segmentation and masking module 102, image dilation module 103, 3D model generator 104, 3D model point sampler 105, 3D point projection module 106, position and orientation optimization module 107, and virtual view module 108 are implemented in hardware via a FPGA.

Image processor 1202 may include any number and type of image or graphics processing units that may provide the operations as discussed herein. Such operations may be implemented via software or hardware or a combination thereof. For example, image processor 1202 may include circuitry dedicated to manipulate and/or analyze images obtained from memory 1203. Central processor 1201 may include any number and type of processing units or modules that may provide control and other high level functions for system 1200 and/or provide any operations as discussed herein. Memory 1203 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1203 may be implemented by cache memory. In an embodiment, one or more or portions of image segmentation and masking module 102, image dilation module 103, 3D model generator 104, 3D model point sampler 105, 3D point projection module 106, position and orientation optimization module 107, and virtual view module 108 are implemented via an execution unit (EU) of image processor 1202. The EU may include, for example, programmable logic or circuitry such as a logic core or cores that may provide a wide array of programmable logic functions. In an embodiment, one or more or portions of image segmentation and masking module 102, image dilation module 103, 3D model generator 104, 3D model point sampler 105, 3D point projection module 106, position and orientation optimization module 107, and virtual view module 108 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 11, process 1100 begins at operation 1101, where a 3D model of a 3D object within a 3D scene is received. The 3D model may be generated using any suitable technique or techniques and may include any suitable data structure. The 3D model may be a rigid model having 6 degrees of freedom: x, y, and z locations and yaw, pitch, and roll orientations or the 3D model may be non-rigid having those 6 degrees of freedom plus additional degrees of freedom defining movement between parts or components thereof. In some embodiments, the 3D model is a mesh object model including a number of indices representative of the 3D object and faces between the indices.

Processing continues at operation 1102, where a first object mask image and a second object mask image are generated, each of the first and second object mask images including a 2D representation of the 3D object, and the first and second object mask images representative of first and second image planes of first and second cameras trained on the 3D scene. Although discussed with respect to first and second object mask images, image planes, cameras and so on, any number may be used such as five or more. The object mask images may include any suitable data structure such as a grayscale image with large values indicative of pixels including the 2D representation of the 3D object and lower values indicative of pixels exclusive of the 2D representation of the 3D object. In some embodiments, generating the first and second object mask images includes determining first and second binary mask images including first pixel values for pixels deemed within the 3D object and second pixel values for pixels deemed outside of the 3D object and dilating the first and second binary images to generate the first and second object mask images. As discussed, in some embodiments, the first and second object mask images are grayscale images. In some embodiments, determining the first and second binary images includes application of a convolutional neural network to first and second source images attained via the first and second cameras. For example, the source images may be input images attained by exposure of the scene by the first and second cameras. In some embodiments, the discussed dilating includes generating an increasing gradient in the first segmented image in a portion of the pixels outside of the object toward pixels within the object. In some embodiments, the discussed dilating includes applying a first gradient or a second gradient responsive to a first initial position and orientation confidence value or a second initial position and orientation confidence value less than the first initial position and orientation confidence value, respectively, such that the first gradient has a greater slope in pixel value change over pixel distance change than the second gradient.

Processing continues at operation 1103, where a number of 3D points of the 3D model are projected onto the first and second image planes based on an initial position and orientation of the 3D model in the 3D scene. The 3D points of the 3D model may be selected using any suitable technique or techniques. In some embodiments, the 3D model is a mesh object model including a number of indices representative of the 3D object and faces between the indices and the 3D points are points from faces of the mesh model. Furthermore, the initial position and orientation may be selected using any suitable technique or techniques. In some embodiments, method 1100 further includes selecting the initial position and orientation of the 3D model as a prior final position and orientation of the 3D model in a prior modeling of the 3D scene. For example, the 3D scene may have been modeled for a previous event (e.g., game, concert, etc.) and a prior final position and orientation of the 3D model (either the same model or a like model) may be used to initialize the position and orientation of the 3D model.

Processing continues at operation 1104, where a final position and orientation of the 3D model in the 3D scene is determined based on optimization of a cost function that compares the first and second object mask images to the projected 3D points on the first and second image planes. For example, the cost function may penalize those projected 3D points that are outside o the 2D representation of the 3D object in each of the first object mask image and a second object mask image. In some embodiments, optimization of the cost function includes minimization of sum of a piecewise linear functions each including a sum of differences between a maximum value of the first and second object mask images differenced with a value of the first and second object mask images corresponding to projections of each of the plurality of 3D points onto the first and second object mask images. In some embodiments, the projection of each of the plurality of 3D points includes determination of a 3D location of each of the plurality of 3D points in the 3D scene using a current position and orientation of the 3D model and projection from the 3D location onto the first and second object mask images using first and second projection matrices corresponding to the first and second image planes. As discussed, process 1100 may be applied to rigid or non-rigid 3D models. In some embodiments, the 3D model is a non-rigid 3D model including one or more degrees of freedom for movements between 3D segments of the 3D model and determining the final position and orientation of the 3D model further inlcuedes determining final parameters for the one or more degrees of freedom for the movements based on optimization of the cost function.

The final position and orientation of the 3D model may be output for use in any suitable context such as reconstruction of the 3D scene, autonomous driving applications, robot navigation and/or interaction applications, augmented reality applications, or the like. In some embodiments, method 1100 further includes generating a virtual view within the 3D scene based at least in part on the final position and orientation of the 3D model in the 3D scene.

Process 1100 may be repeated any number of times either in series or in parallel for any number of 3D objects. Process 1100 provides for locating and orienting a 3D model of a 3D object in a scene. Process 1000 may be implemented by any suitable device(s), system(s), apparatus(es), or platform(s) such as those discussed herein. In an embodiment, process 1100 is implemented by a system or apparatus having a memory to store a 3D model source and target images, as well as any other discussed data structures, and a processor to perform operations 1101-1104. In an embodiment, the memory and the processor are implemented via a monolithic field programmable gate array integrated circuit. As used herein, the term monolithic indicates a device that is discrete from other devices, although it may be coupled to other devices for communication and power supply.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 13:
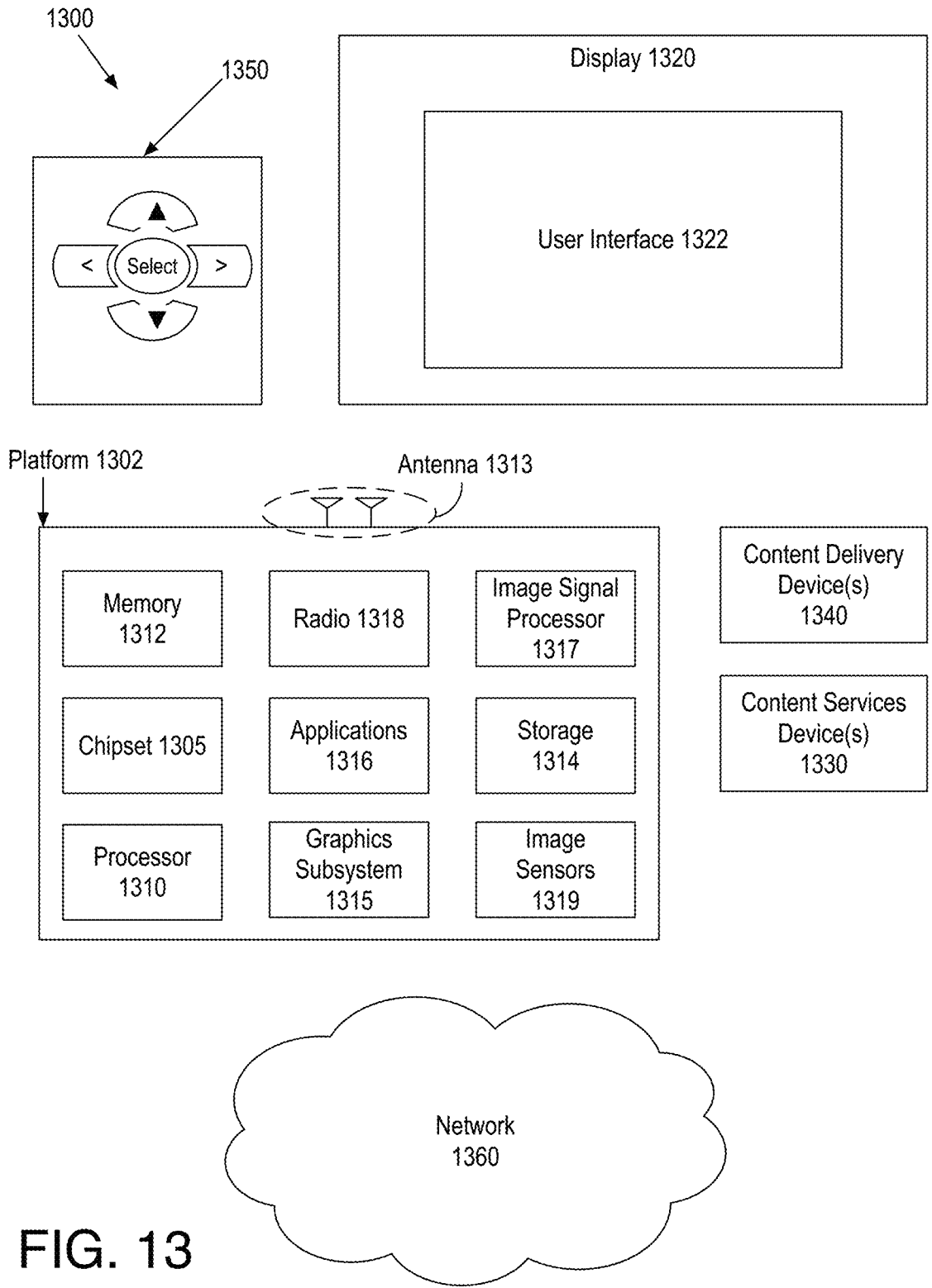
FIG. 13 is an illustrative diagram of an example system.

FIG. 13 is an illustrative diagram of an example system 1300, arranged in accordance with at least some implementations of the present disclosure. In various implementations, system 1300 may be a mobile device system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth.

In various implementations, system 1300 includes a platform 1302 coupled to a display 1320. Platform 1302 may receive content from a content device such as content services device(s) 1330 or content delivery device(s) 1340 or other content sources such as image sensors 1319. For example, platform 1302 may receive image data as discussed herein from image sensors 1319 or any other content source. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, antenna 1313, storage 1314, graphics subsystem 1315, applications 1316, image signal processor 1317 and/or radio 1318. Chipset 1305 may provide intercommunication among processor 1310, memory 1312, storage 1314, graphics subsystem 1315, applications 1316, image signal processor 1317 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Image signal processor 1317 may be implemented as a specialized digital signal processor or the like used for image processing. In some examples, image signal processor 1317 may be implemented based on a single instruction multiple data or multiple instruction multiple data architecture or the like. In some examples, image signal processor 1317 may be characterized as a media processor. As discussed herein, image signal processor 1317 may be implemented based on a system on a chip architecture and/or based on a multi-core architecture.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 may be integrated into processor 1310 or chipset 1305. In some implementations, graphics subsystem 1315 may be a stand-alone device communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

Image sensors 1319 may include any suitable image sensors that may provide image data based on a scene. For example, image sensors 1319 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1319 may include any device that may detect information of a scene to generate image data.

In various implementations, content services device(s) 1330 may include a cable television box, personal computer, network, telephone, Internet enabled devices or appliance capable of delivering digital information and/or content, and any other similar device capable of uni-directionally or bi-directionally communicating content between content providers and platform 1302 and/display 1320, via network 1360 or directly. It will be appreciated that the content may be communicated uni-directionally and/or bi-directionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of navigation controller 1350 may be used to interact with user interface 1322, for example. In various embodiments, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In various embodiments, navigation controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off" In addition, chipset 1305 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
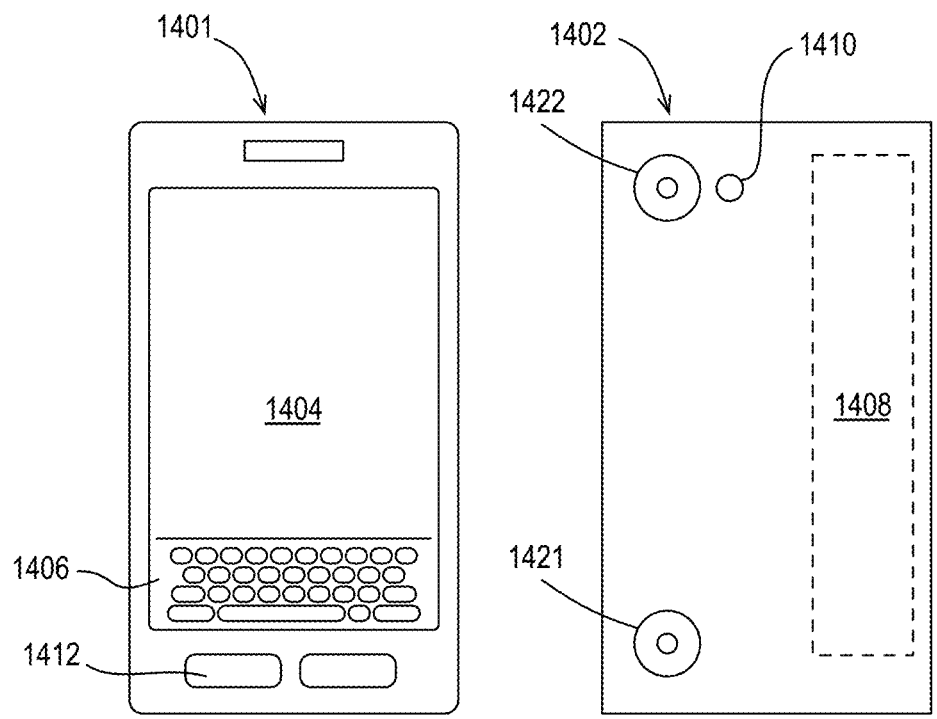
FIG. 14 illustrates an example device, all arranged in accordance with at least some implementations of the present disclosure.

As described above, system 1300 may be embodied in varying physical styles or form factors. FIG. 14 illustrates an example small form factor device 1400, arranged in accordance with at least some implementations of the present disclosure. In some examples, system 1400 may be implemented via device 1400. In other examples, other systems, components, or modules discussed herein or portions thereof may be implemented via device 1400. In various embodiments, for example, device 1400 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 14, device 1400 may include a housing with a front 1401 and a back 1402. Device 1400 includes a display 1404, an input/output (I/O) device 1406, a color camera 1421, a color camera 1422, an infrared transmitter 1423, and an integrated antenna 1408. In some embodiments, color camera 1421 and color camera 1422 attain planar images as discussed herein. In some embodiments, device 1400 does not include color camera 1421 and 1422 and device 1400 attains input image data (e.g., any input image data discussed herein) from another device. Device 1400 also may include navigation features 1412. I/O device 1406 may include any suitable I/O device for entering information into a mobile computing device. Examples for I/O device 1406 may include an alphanumeric keyboard, a numeric keypad, a touch pad, input keys, buttons, switches, microphones, speakers, voice recognition device and software, and so forth. Information also may be entered into device 1400 by way of microphone (not shown), or may be digitized by a voice recognition device. As shown, device 1400 may include color cameras 1421, 1422, and a flash 1410 integrated into back 1402 (or elsewhere) of device 1400. In other examples, color cameras 1421, 1422, and flash 1410 may be integrated into front 1401 of device 1400 or both front and back sets of cameras may be provided. Color cameras 1421, 1422 and a flash 1410 may be components of a camera module to originate color image data with IR texture correction that may be processed into an image or streaming video that is output to display 1404 and/or communicated remotely from device 1400 via antenna 1408 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for generating a virtual view within a 3D scene comprises receiving a 3D model of a 3D object within the 3D scene, generating a first object mask image and a second object mask image, each of the first and second object mask images comprising a 2D representation of the 3D object, and the first and second object mask images representative of first and second image planes of first and second cameras trained on the 3D scene, projecting, based on an initial position and orientation of the 3D model in the 3D scene, a plurality of 3D points of the 3D model onto the first and second image planes, and determining a final position and orientation of the 3D model in the 3D scene based on optimization of a cost function that compares the first and second object mask images to the projected 3D points on the first and second image planes.

In one or more second embodiments, further to the first embodiment, optimization of the cost function comprises minimization of a sum of piecewise linear functions each comprising a sum of differences between a maximum value of the first and second object mask images differenced with a value of the first and second object mask images corresponding to projections of each of the plurality of 3D points onto the first and second object mask images.

In one or more third embodiments, further to the first or second embodiments, the projection of each of the plurality of 3D points comprises determination of a 3D location of each of the plurality of 3D points in the 3D scene using a current position and orientation of the 3D model and projection from the 3D location onto the first and second object mask images using first and second projection matrices corresponding to the first and second image planes.

In one or more fourth embodiments, further to any of the first through third embodiments, the method further comprises selecting the initial position and orientation of the 3D model as a prior final position and orientation of the 3D model in a prior modeling of the 3D scene.

In one or more fifth embodiments, further to any of the first through fourth embodiments, said generating the first and second object mask images comprises determining first and second binary mask images comprising first pixel values for pixels deemed within the 3D object and second pixel values for pixels deemed outside of the 3D object and dilating the first and second binary images to generate the first and second object mask images, wherein the first and second object mask images comprise grayscale images.

In one or more sixth embodiments, further to any of the first through fifth embodiments, said determining the first and second binary images comprises application of a convolutional neural network to first and second source images attained via the first and second cameras.

In one or more seventh embodiments, further to any of the first through sixth embodiments, said dilating comprises generating an increasing gradient in the first segmented image in a portion of the pixels outside of the object toward pixels within the object.

In one or more eighth embodiments, further to any of the first through seventh embodiments, said dilating comprises applying a first gradient or a second gradient responsive to a first initial position and orientation confidence value or a second initial position and orientation confidence value less than the first initial position and orientation confidence value, respectively, wherein the first gradient has a greater slope in pixel value change over pixel distance change than the second gradient.

In one or more ninth embodiments, further to any of the first through eighth embodiments, the 3D model comprises a mesh object model comprising a plurality of indices representative of the 3D object and faces between the indices, and the plurality of 3D points comprise points from faces of the mesh model.

In one or more tenth embodiments, further to any of the first through ninth embodiments, the 3D model comprises a non-rigid 3D model comprising one or more degrees of freedom for movements between 3D segments of the 3D model and determining the final position and orientation of the 3D model further comprises determining final parameters for the one or more degrees of freedom for the movements based on optimization of the cost function.

In one or more eleventh embodiments, further to any of the first through tenth embodiments, the method further comprises generating the virtual view within the 3D scene based at least in part on the final position and orientation of the 3D model in the 3D scene.

In one or more twelfth embodiments, a device or system includes a memory and one or more processors to perform a method according to any one of the above embodiments.

In one or more thirteenth embodiments, at least one machine readable medium includes a plurality of instructions that in response to being executed on a computing device, cause the computing device to perform a method according to any one of the above embodiments.

In one or more fourteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for generating a virtual view within a 3D scene comprising:
   a memory to store a 3D model of a 3D object within the 3D scene; and
   one or more processors coupled to the memory, the one or more processors to:
   generate a first object mask image and a second object mask image, each of the first and second object mask images comprising a 2D representation of the 3D object, and the first and second object mask images representative of first and second image planes of first and second cameras trained on the 3D scene;
   project, based on an initial position and orientation of the 3D model in the 3D scene, a plurality of 3D points of the 3D model onto the first and second image planes; and
   determine a final position and orientation of the 3D model in the 3D scene based on optimization of a cost function that compares the first and second object mask images to the projected 3D points on the first and second image planes.

2. The system of claim 1, wherein optimization of the cost function comprises minimization of a sum of piecewise linear functions each comprising a sum of differences between a maximum value of the first and second object mask images differenced with a value of the first and second object mask images corresponding to projections of each of the plurality of 3D points onto the first and second object mask images.

3. The system of claim 2, wherein the projection of each of the plurality of 3D points comprises determination of a 3D location of each of the plurality of 3D points in the 3D scene using a current position and orientation of the 3D model and projection from the 3D location onto the first and second object mask images using first and second projection matrices corresponding to the first and second image planes.

4. The system of claim 1, further comprising the one or more processors to select the initial position and orientation of the 3D model as a prior final position and orientation of the 3D model in a prior modeling of the 3D scene.

5. The system of claim 1, wherein the one or more processors to generate the first and second object mask images comprises the one or more processors to determine first and second binary mask images comprising first pixel values for pixels deemed within the 3D object and second pixel values for pixels deemed outside of the 3D object and to dilate the first and second binary mask images to generate the first and second object mask images, wherein the first and second object mask images comprise grayscale images.

6. The system of claim 5, wherein the one or more processors to determine the first and second binary mask images comprises application of a convolutional neural network to first and second source images attained via the first and second cameras.

7. The system of claim 5, wherein the one or more processors to dilate comprises the one or more processors to generate an increasing gradient in the first binary mask image in a portion of the pixels outside of the object toward pixels within the object.

8. The system of claim 7, wherein the one or more processors to dilate comprises the one or more processors to apply a first gradient or a second gradient responsive to a first initial position and orientation confidence value or a second initial position and orientation confidence value less than the first initial position and orientation confidence value, respectively, wherein the first gradient has a greater slope in pixel value change over pixel distance change than the second gradient.

9. The system of claim 1, wherein the 3D model comprises a mesh object model comprising a plurality of indices representative of the 3D object and faces between the indices, and the plurality of 3D points comprise points from faces of the mesh model.

10. The system of claim 1, wherein the 3D model comprises a non-rigid 3D model comprising one or more degrees of freedom for movements between 3D segments of the 3D model and the one or more processors to determine the final position and orientation of the 3D model further comprises the one or more processors to determine final parameters for the one or more degrees of freedom for the movements based on optimization of the cost function.

11. The system of claim 1, the one or more processors to:
generate the virtual view within the 3D scene based at least in part on the final position and orientation of the 3D model in the 3D scene.

12. A method for generating a virtual view within a 3D scene comprising:
receiving a 3D model of a 3D object within the 3D scene;
generating a first object mask image and a second object mask image, each of the first and second object mask images comprising a 2D representation of the 3D object, and the first and second object mask images representative of first and second image planes of first and second cameras trained on the 3D scene;
projecting, based on an initial position and orientation of the 3D model in the 3D scene, a plurality of 3D points of the 3D model onto the first and second image planes; and
determining a final position and orientation of the 3D model in the 3D scene based on optimization of a cost function that compares the first and second object mask images to the projected 3D points on the first and second image planes.

13. The method of claim 12, wherein optimization of the cost function comprises minimization of a sum of piecewise linear functions each comprising a sum of differences between a maximum value of the first and second object mask images differenced with a value of the first and second object mask images corresponding to projections of each of the plurality of 3D points onto the first and second object mask images.

14. The method of claim 12, wherein said generating the first and second object mask images comprises determining first and second binary mask images comprising first pixel values for pixels deemed within the 3D object and second pixel values for pixels deemed outside of the 3D object and dilating the first and second binary mask images to generate the first and second object mask images, wherein the first and second object mask images comprise grayscale images.

15. The method of claim 14, wherein said dilating comprises generating an increasing gradient in the first binary mask image in a portion of the pixels outside of the object toward pixels within the object and wherein said dilating comprises applying a first gradient or a second gradient responsive to a first initial position and orientation confidence value or a second initial position and orientation confidence value less than the first initial position and orientation confidence value, respectively, wherein the first gradient has a greater slope in pixel value change over pixel distance change than the second gradient.

16. The method of claim 12, wherein the 3D model comprises a non-rigid 3D model comprising one or more degrees of freedom for movements between 3D segments of the 3D model and determining the final position and orientation of the 3D model further comprises determining final parameters for the one or more degrees of freedom for the movements based on optimization of the cost function.

17. At least one non-transitory machine readable medium comprising a plurality of instructions that, in response to being executed on a computing device, cause the computing device to generate a virtual view within a 3D scene by:
receiving a 3D model of a 3D object within the 3D scene;
generating a first object mask image and a second object mask image, each of the first and second object mask images comprising a 2D representation of the 3D object, and the first and second object mask images representative of first and second image planes of first and second cameras trained on the 3D scene;
projecting, based on an initial position and orientation of the 3D model in the 3D scene, a plurality of 3D points of the 3D model onto the first and second image planes; and
determining a final position and orientation of the 3D model in the 3D scene based on optimization of a cost function that compares the first and second object mask images to the projected 3D points on the first and second image planes.

18. The non-transitory machine readable medium of claim 17, wherein optimization of the cost function comprises minimization of a sum of piecewise linear functions each comprising a sum of differences between a maximum value of the first and second object mask images differenced with a value of the first and second object mask images corresponding to projections of each of the plurality of 3D points onto the first and second object mask images.

19. The non-transitory machine readable medium of claim 17, wherein said generating the first and second object mask images comprises determining first and second binary mask images comprising first pixel values for pixels deemed within the 3D object and second pixel values for pixels deemed outside of the 3D object and dilating the first and second binary mask images to generate the first and second object mask images, wherein the first and second object mask images comprise grayscale images.

20. The non-transitory machine readable medium of claim 19, wherein said dilating comprises generating an increasing gradient in the first binary mask image in a portion of the pixels outside of the object toward pixels within the object and wherein said dilating comprises applying a first gradient or a second gradient responsive to a first initial position and orientation confidence value or a second initial position and orientation confidence value less than the first initial position and orientation confidence value, respectively, wherein the first gradient has a greater slope in pixel value change over pixel distance change than the second gradient.

* * * * *